(12) United States Patent
Chang

(10) Patent No.: US 10,627,856 B1
(45) Date of Patent: Apr. 21, 2020

(54) FOLDABLE PROTECTIVE ASSEMBLY AND PROTECTIVE CASE THEREOF

(71) Applicant: Sonnenschein(Shenzhen) Ind. Co., Ltd., ShenZhen (CN)

(72) Inventor: Shao-Han Chang, New Taipei (TW)

(73) Assignee: Sonnenschein(Shenzhen) Ind. Co., Ltd., ShenZhen (CN)

( * ) Notice: Subject to any disclaimer, the term of this patent is extended or adjusted under 35 U.S.C. 154(b) by 0 days.

(21) Appl. No.: 16/432,871

(22) Filed: Jun. 5, 2019

(30) Foreign Application Priority Data

Feb. 27, 2019 (CN) .......................... 2019 1 0145762

(51) Int. Cl.
| | |
|---|---|
| *G06F 1/18* | (2006.01) |
| *G06F 1/16* | (2006.01) |
| *A45C 13/00* | (2006.01) |
| *G09F 9/30* | (2006.01) |
| *A45C 11/00* | (2006.01) |

(52) U.S. Cl.
CPC .......... *G06F 1/1616* (2013.01); *A45C 13/002* (2013.01); *A45C 2011/002* (2013.01); *G06F 1/1652* (2013.01); *G09F 9/301* (2013.01)

(58) Field of Classification Search
CPC .................................. H05K 5/00; G06F 1/18
See application file for complete search history.

(56) References Cited

U.S. PATENT DOCUMENTS

| | | | |
|---|---|---|---|
| 9,703,330 B2 * | 7/2017 | Johnson .............. | H04M 1/0252 |
| 2019/0008059 A1 * | 1/2019 | Cavenagh ............. | G06F 1/1686 |

* cited by examiner

*Primary Examiner* — Jerry Wu
(74) *Attorney, Agent, or Firm* — Li & Cai Intellectual Property Office

(57) ABSTRACT

A protective case of a foldable protective assembly defines a longitudinal direction, a width direction, and a thickness direction, which are perpendicular to each other. The protective case includes a first lower frame, a second lower frame, and two lower elastic members. Each of the first lower frame and the second lower frame has a U-shaped section perpendicular to the thickness direction. Two ends of the first lower frame respectively face two ends of the second lower frame along the longitudinal direction. The two lower elastic members respectively connect the two ends of the first lower frame to the two ends of the second lower frame. One of the first lower frame and the second lower frame is rotatable relative to the other one by elastically bending the two lower elastic members, and the protective case is configured to cover a periphery portion of a foldable mobile device.

6 Claims, 12 Drawing Sheets

FOLDABLE PROTECTIVE ASSEMBLY AND PROTECTIVE CASE THEREOF

CROSS-REFERENCE TO RELATED PATENT APPLICATION

This application claims the benefit of priority to China Patent Application No. 201910145762.3, filed on Feb. 27, 2019 in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a protecting assembly, and more particularly to a foldable protective assembly and a protective case thereof for being detachably assembled to a foldable mobile device.

BACKGROUND OF THE DISCLOSURE

A mobile device (e.g., a smart phone or a tablet PC) provided with a foldable screen is the current trend, but a conventional protecting member (e.g., a protective case assembled to a smart phone or a screen protection film adhered to the smart phone) cannot be applied to the foldable screen or the mobile device.

SUMMARY OF THE DISCLOSURE

In response to the above-referenced technical inadequacies, the present disclosure provides a foldable protective assembly and a protective case to effectively improve the issues associated with conventional protecting members.

In one aspect, the present disclosure provides a foldable protective assembly for being detachably assembled to a foldable mobile device. The foldable protective assembly includes a lower protecting case, an upper protecting case, and a screen protection film. The lower protecting case defines a longitudinal direction, a width direction, and a thickness direction, which are perpendicular to each other. The lower case includes a first lower frame, a second lower frame, and two lower elastic members. The first lower frame and the second lower frame each have a U-shaped section perpendicular to the thickness direction. Two ends of the first lower frame respectively face two ends of the second lower frame along the longitudinal direction. The two lower elastic members respectively connect the two ends of the first lower frame to the two ends of the second lower frame. The upper protecting case is detachably engaged with the lower protecting case, and includes a first upper frame, a second upper frame, and two upper elastic members. The first upper frame and the second upper frame each have a U-shaped section perpendicular to the thickness direction. Two ends of the first upper frame respectively face two ends of the second upper frame along the longitudinal direction. The two upper elastic members respectively connect the two ends of the first upper frame to the two ends of the second upper frame. The first lower frame and the second lower frame are respectively engaged with the first upper frame and the second upper frame along the thickness direction so as to be defined as two engaged sets, and the two upper elastic members respectively face the two lower elastic members along the thickness direction. The screen protection film is detachably assembled to at least one of the lower protecting case and the upper protecting case, and is movable along the longitudinal direction. One of the two engaged sets is rotatable relative to the other one of the two engaged sets by elastically bending the two lower elastic members and the two upper elastic members so that the screen protection film is elastically deformed by a force applied thereon. The two engaged sets are configured to cover a periphery portion of the foldable mobile device, and the screen protection film is configured to be detachably disposed on a foldable screen of the foldable mobile device.

In certain embodiments, the lower protecting case further includes a first bottom board and a second bottom board. Edges of the first bottom board are connected to the first lower frame, and the first bottom board and the first lower frame jointly surround to define a first accommodating space. Edges of the second bottom board are connected to the second lower frame, and the second bottom board and the second lower frame jointly surround to define a second accommodating space. The first bottom board and the second bottom board are configured to carry the foldable mobile device, and the first accommodating space and the second accommodating space are configured to accommodate a part of the foldable mobile device.

In certain embodiments, the lower protecting case further includes two combining members respectively mounted on the first bottom board and the second bottom board. When the first lower frame is rotated relative to the second lower frame to cause the first bottom board to face the second bottom board, the two combining members fix each other in position so as to maintain the relative positioning of the first bottom board and the second bottom board.

In certain embodiments, each of the two ends of the first lower frame has a supporting curved surface, and each of the two ends of the second lower frame has a supporting curved surface. When the first lower frame is rotated relative to the second lower frame, the supporting curved surfaces of the first lower frame and the second lower frame abut against and support the two lower elastic members.

In certain embodiments, each of the two ends of the first upper frame has a first protrusion, each of the two ends of the second upper frame has a second protrusion, and two opposite portions of each of the two upper elastic members respectively has two thru-holes each defined by a plurality of inner walls. In one of the two ends of the first upper frame and one of the two ends of the second upper frame that face each other, the first protrusion and the second protrusion are respectively coupled through the two thru-holes of one of the two upper elastic members. When each of the two upper elastic members is elastically bent, the first protrusion and the corresponding second protrusion move from two of the inner walls adjacent to each other toward two of the inner walls away from each other.

In certain embodiments, the screen protection film is detachably assembled to the lower protecting case, and includes two long edges and two short edges. The two long edges each are parallel to the longitudinal direction and each have a plurality of limiting portions. The limiting portions of the two long edges are respectively assembled to the first lower frame and the second lower frame so as to prevent the screen protection film from moving relative to the lower protecting case along the width direction. The two short edges each are parallel to the width direction and each have a plurality of buffering portions. The buffering portions of the two short edges are respectively assembled to the first lower frame and the second lower frame, so that when the first lower frame is rotated relative to the second lower frame, the first lower frame and the second lower frame are configured to apply a force onto the screen protection film through the buffering portions.

In one aspect, the present disclosure provides a protective case of a foldable protective assembly for being detachably assembled to a foldable mobile device. The protective case includes a lower protecting case and an upper protecting case. The lower protecting case defines a longitudinal direction, a width direction, and a thickness direction, which are perpendicular to each other, wherein the lower case includes a first lower frame, a second lower frame, and two lower elastic members. The first lower frame and the second lower frame each have a U-shaped section perpendicular to the thickness direction. Two ends of the first lower frame respectively face two ends of the second lower frame along the longitudinal direction. The two lower elastic members respectively connect the two ends of the first lower frame to the two ends of the second lower frame. The upper protecting case is detachably engaged with the lower protecting case and includes a first upper frame and a second upper frame. Each of the first upper frame and the second upper frame has a U-shaped section perpendicular to the thickness direction. Two ends of the first upper frame respectively face two ends of the second upper frame along the longitudinal direction. The first lower frame and the second lower frame are respectively engaged with the first upper frame and the second upper frame along the thickness direction so as to be defined as two engaged sets, and one of the two engaged sets is rotatable relative to the other one of the two engaged sets by elastically bending the two lower elastic members. The two engaged sets are configured to cover a periphery portion of the foldable mobile device.

In one aspect, the present disclosure provides a protective case of a foldable protective assembly defining a longitudinal direction, a width direction, and a thickness direction, which are perpendicular to each other. The protective case includes a first lower frame, a second lower frame, and two lower elastic members. The first lower frame and the second lower frame each have a U-shaped section perpendicular to the thickness direction. Two ends of the first lower frame respectively face two ends of the second lower frame along the longitudinal direction. The two lower elastic members respectively connect the two ends of the first lower frame to the two ends of the second lower frame. One of the first lower frame and the second lower frame is rotatable relative to the other one of the first lower frame and the second lower frame by elastically bending the two lower elastic members, and the protective case is configured to cover a periphery portion of the foldable mobile device.

Therefore, the foldable protective assembly and the protective case of the present disclosure can be bent according to a foldable function of a foldable mobile device, so that the foldable mobile device can be physically protected in an unfolded state or a folded state. Specifically, the protective case is used to be fixed onto the foldable mobile device and to protect a foldable screen of the foldable mobile device by the combination of the lower protecting case and the upper protecting case.

Moreover, the foldable protective assembly can be provided with the screen protection film arranged in the protective case and arranged above the foldable screen, thereby providing a physical protection for the foldable screen. Compared to the conventional screen protection film using an adhesive, the screen protection film in the present embodiment can be used without any adhesive or can be used with an adhesive on a part thereof, so that the screen protection film can be slightly deformed along with the folding of the foldable mobile device for effectively protecting the foldable screen of the foldable mobile device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
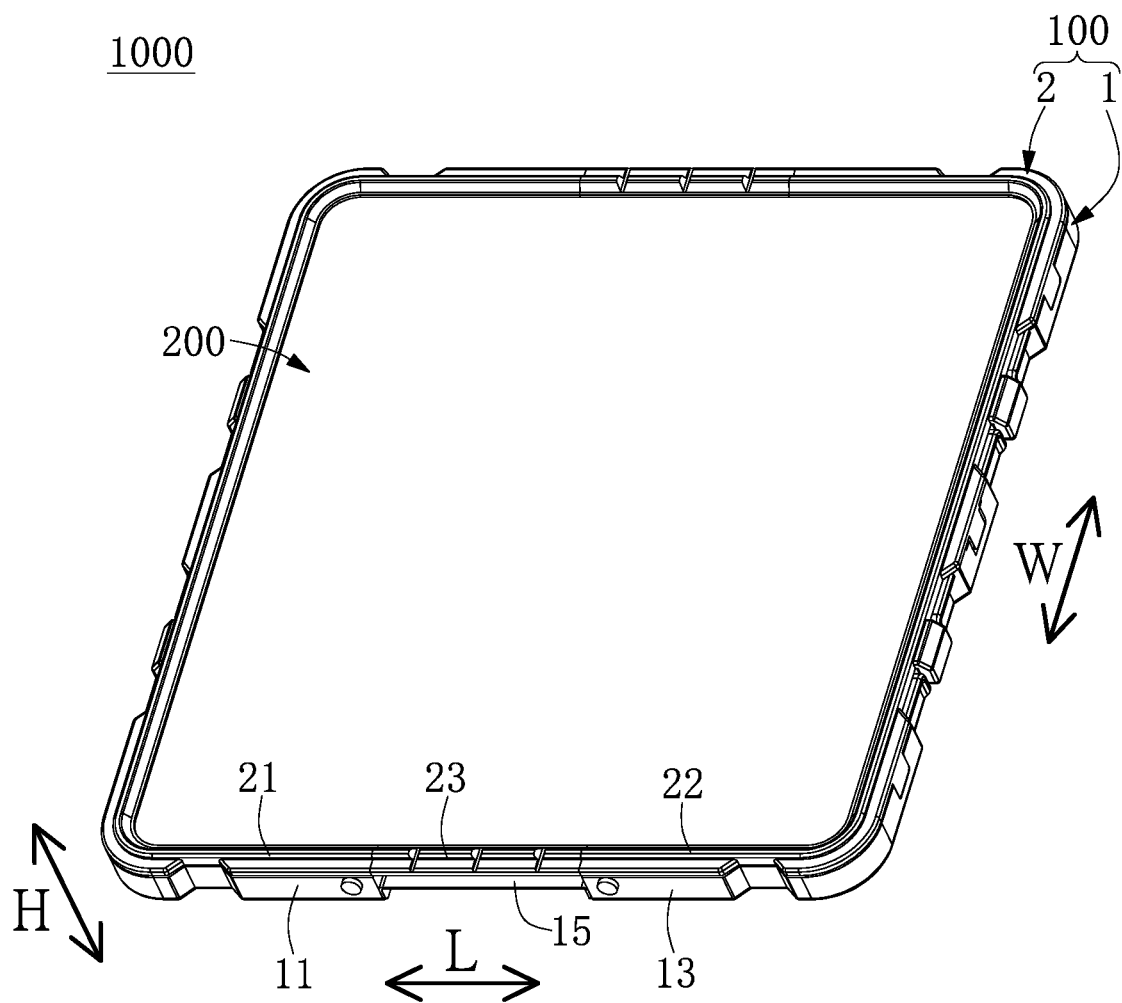
FIG. 1 is a perspective view of a foldable protective assembly according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
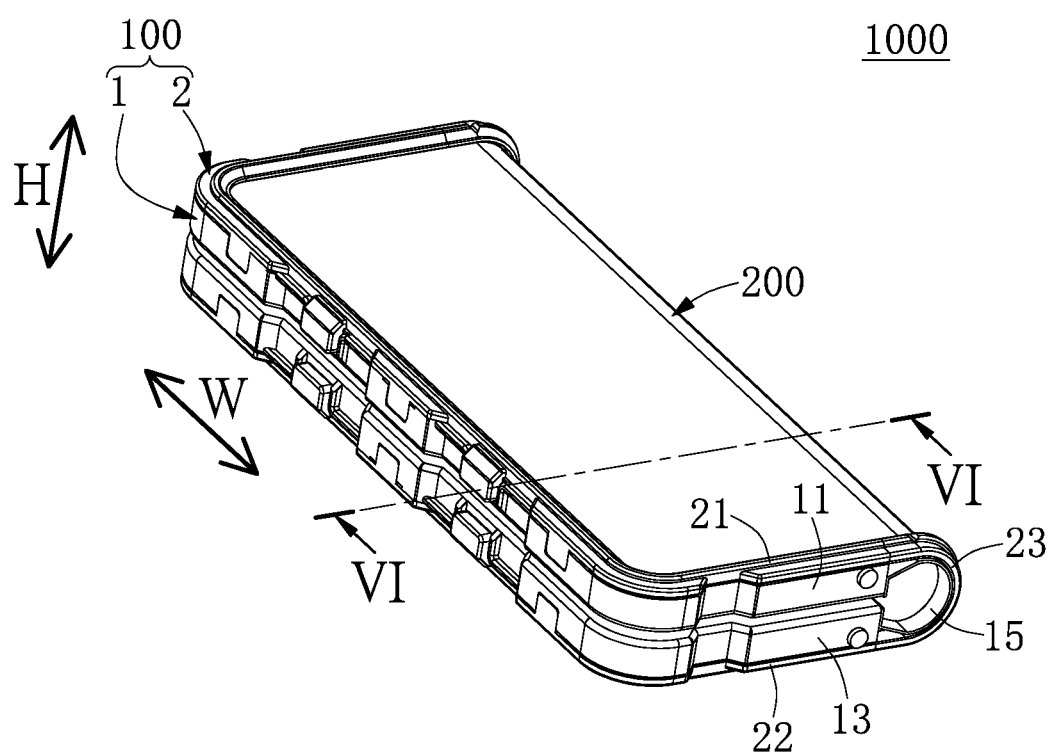
FIG. 2 is a perspective view showing the foldable protective assembly of FIG. 1 after being bent.

Referring to FIG. 1 to FIG. 6, a first embodiment of the present disclosure provides a foldable protective assembly 1000. As shown in FIG. 1 and FIG. 2, the foldable protective assembly 1000 is provided for being detachably assembled to a foldable mobile device (not shown), and can be folded along with the foldable mobile device at the same time. The foldable mobile device in the present embodiment can be a foldable smart phone (or a foldable tablet PC) having a foldable screen, but the present disclosure is not limited thereto.

Moreover, the foldable protective assembly 1000 in the present embodiment is applied to an outwardly foldable mobile device (i.e., when the foldable mobile device is folded, the foldable screen is arranged on an outer side of the foldable mobile device), but the present disclosure is not limited thereto. In other embodiments of the present disclosure, the foldable protective assembly 1000 can be applied to an inwardly foldable mobile device (i.e., when the foldable mobile device is folded, the foldable screen is arranged on an inner side of the foldable mobile device). It should be noted that any protecting structure not configured to be detachably assembled to a foldable mobile device is different from the foldable protective assembly 1000 disclosed in the present embodiment.

Figure 3:
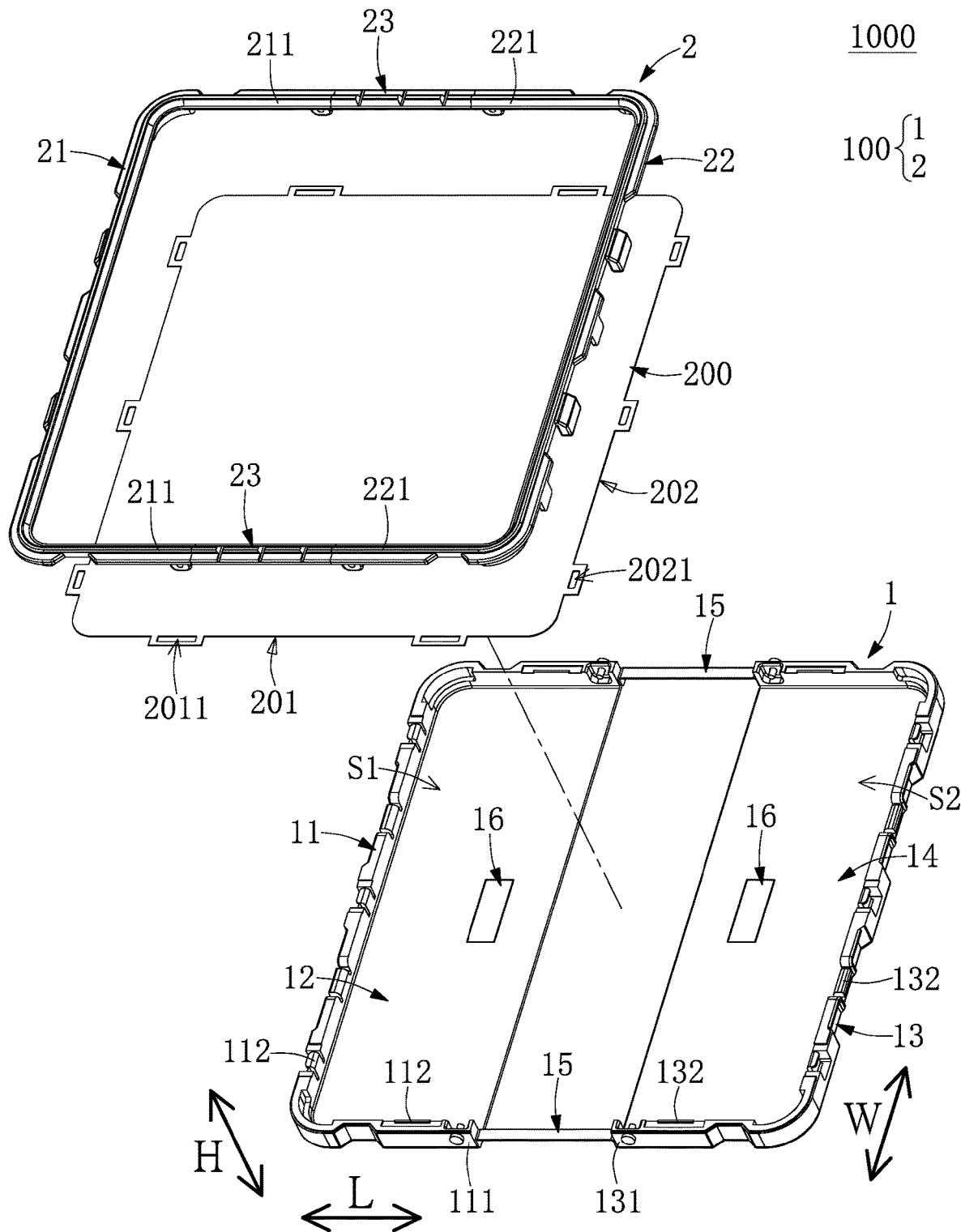
FIG. 3 is an exploded view of FIG. 1.

As shown in FIG. 3, the foldable protective assembly 1000 includes a protective case 100 and a screen protection film 200 that is detachably assembled to the protective case 100. The protective case 100 in the present is in cooperation with the screen protection film 200, but the present disclosure is not limited thereto. In other embodiments of the present disclosure, the protective case 100 can be independently assembled to the foldable mobile device.

Moreover, the protective case 100 in the present embodiment includes a lower protecting case 1 and an upper protecting case 2 that is detachably engaged with the lower protecting case 1, but the present disclosure is not limited thereto. For example, in other embodiments of the present disclosure, the protective case 100 may also include only the lower protecting case 1 for covering a periphery portion of the foldable mobile device.

The following description describes the structure and connection relationship of each component of the foldable protective assembly 1000. The lower protecting case 1 defines a longitudinal direction L, a width direction W, and a thickness direction H, which are perpendicular to each other. In the following description of the present embodiment, the longitudinal direction L is changeable according to the bending of the lower protecting case 1.

As shown in FIG. 3, the lower protecting case 1 includes a first lower frame 11, a first bottom board 12 connected to the first lower frame 11 through edges thereof, a second lower frame 13, a second bottom board 14 connected to the second lower frame 13 through edges thereof, and two lower elastic members 15 connecting the first lower frame 11 and the second lower frame 13. Materials of the above components of the lower protecting case 1 are disclosed as follows. Any one of the first lower frame 11, the first bottom board 12, the second lower frame 13, and the second bottom board 14 can be made of metal or plastic. The lower elastic members 15 can be made of a resilient polymer (e.g., a rubber, a silicone, or a polyurethane), an elastic piece (e.g., an elastic sheet or a spring), or a polymer having an elastic piece embedded therein.

Moreover, the connection of the two lower elastic members 15, the first lower frame 11, and the second lower frame 13 can be adjusted according to the materials thereof. For example, when the two lower elastic members 15, the first lower frame 11, and the second lower frame 13 are made of the same thermoplastic engineering plastic, the lower protecting case 1 can be formed by an injection molding in one process. When the two lower elastic members 15 are made of a thermoplastic engineering plastic different from that of the first lower frame 11 and the second lower frame 13, the lower protecting case 1 can be formed by a double-shot molding in one process. When the two lower elastic members 15 are made of a heat-resistant material (e.g., an elastic sheet of stainless steel), and the first lower frame 11 and the second lower frame 13 are made of the same thermoplastic engineering plastic, the lower protecting case 1 can be formed by an insert molding in one process. In addition, the two lower elastic members 15 can be connected to the first lower frame 11 and the second lower frame 13 by a conventional connecting manner (e.g., an adhering manner, an engaging manner, a riveting manner, a screwing manner, or a welding manner).

Structural design of the above components of the lower protecting case 1 is disclosed as follows. Each of the first lower frame 11 and the second lower frame 13 has a U-shaped section perpendicular to the thickness direction H, and two ends 111 of the first lower frame 11 respectively face two ends 131 of the second lower frame 13 along the longitudinal direction L. The two lower elastic members 15 respectively connect the two ends 111 of the first lower frame 11 to the two ends 131 of the second lower frame 13, so that one of the first lower frame 11 and the second lower frame 13 is rotatable relative to the other one of the first lower frame 11 and the second lower frame 13 by elastically bending the two lower elastic members 15.

The lower elastic member 15 in the present embodiment is a flat elastic sheet, but in other embodiments of the present disclosure, the lower elastic member 15 can be a wave-shaped elastic sheet or an arced elastic sheet. The elastic force of the lower elastic member 15 can be adjusted by changing its material, thickness, width, or structure (e.g., the lower elastic member 15 can be formed with at least one hole) thereof according to design requirement. Moreover, an outer surface of the lower elastic member 15 can be painted, covered by adhesive, or combined with decorative piece for increasing its safety.

The edges of the first bottom board 12 are integrally connected to the first lower frame 11, and the first bottom board 12 and the first lower frame 11 jointly surround to define a first accommodating space S1. The edges of the second bottom board 14 are integrally connected to the second lower frame 13, and the second bottom board 14 and the second lower frame 13 jointly surround to define a second accommodating space S2. The shapes of the first bottom board 12 and the second bottom board 14 in the present embodiment are rectangular, but can be changed according to design requirement. For example, in other embodiments of the present disclosure, the first bottom board 12 (or/and the second bottom board 14) can be formed with a plurality of thru-holes, or can be formed in a U-shaped structure, thereby reducing its weight.

In summary, when the lower protecting case 1 is assembled to the foldable mobile device, the first lower frame 11 and the second lower frame 13 are respectively arranged around two opposite portions of the foldable mobile device that cannot be folded, a foldable portion of the foldable mobile device is arranged between the two lower elastic members 15, the first bottom board 12 and the second bottom board 14 are configured to carry the foldable mobile device, and the first accommodating space S1 and the second accommodating space S2 are configured to accommodate a part (e.g., the two opposite portions) of the foldable mobile device. Accordingly, the first bottom board 12 and the second bottom board 14 can be provided to effectively strengthening the combination of the lower protecting case 1 and the foldable mobile device, and can be provided to protect a bottom of the foldable mobile device.

In addition, the lower protecting case 1 in the present embodiment further includes two combining members 16 respectively mounted on the first bottom board 12 and the second bottom board 14. When the first lower frame 11 is rotated relative to the second lower frame 13 to cause the first bottom board 12 to face the second bottom board 14, the two combining members 16 fix each other in position so as to maintain the relative positioning of the first bottom board 12 and the second bottom board 14. Moreover, the two combining members 16 can be positioned with each other by an attaching manner, an engaging manner, or a magnetic manner, and the present disclosure is not limited thereto. In other embodiments of the present disclosure, the lower protecting case 1 can be provided without at least one of the first bottom board 12, the second bottom board 14, and the two combining members 16.

The upper protecting case 2 includes a first upper frame 21, a second upper frame 22, and two upper elastic members 23 that connect the first upper frame 21 and the second upper frame 22. Materials of the above components of the upper protecting case 2 are described as follows. The materials of the first upper frame 21, the second upper frame 22, and the two upper elastic members 23 are similar to the materials of the first lower frame 11, the second lower frame 13, and the two lower elastic members 15, respectively.

The structural design of the above components of the upper protecting case 2 is described as follows. The first upper frame 21 and the second upper frame 22 each have a U-shaped section perpendicular to the thickness direction H, and two ends 211 of the first upper frame 21 respectively face two ends 221 of the second upper frame 22 along the longitudinal direction L. The two upper elastic members 23 respectively connect the two ends 211 of the first upper frame 21 to the two ends 221 of the second upper frame 22, so that one of the first upper frame 21 and the second upper frame 22 is rotatable relative to the other one of the first upper frame 21 and the second upper frame 22 by elastically bending the two upper elastic members 23.

The upper elastic member 23 in the present embodiment is a flat elastic sheet, and the upper elastic member 23 can be changed according to design requirement. For example, the variety of the upper elastic member 23 can be similar to that of the lower elastic member 15. It should be noted that the foldable protective assembly 1000 in the present embodiment is applied to the outwardly foldable mobile device, and the upper protecting case 2 will generate a larger stretch when being bent, so that each of the two upper elastic members 23 is preferably movable relative to at least one of the first upper frame 21 and the second upper frame 22 for absorbing the larger stretch, but the present disclosure is not limited thereto. In other words, in other embodiments of the present disclosure, when the foldable protective assembly 1000 is applied to an inwardly foldable mobile device, each of the lower elastic members 15 is preferably movable relative to at least one of the first lower frame 11 and the second lower frame 13.

Figure 4:
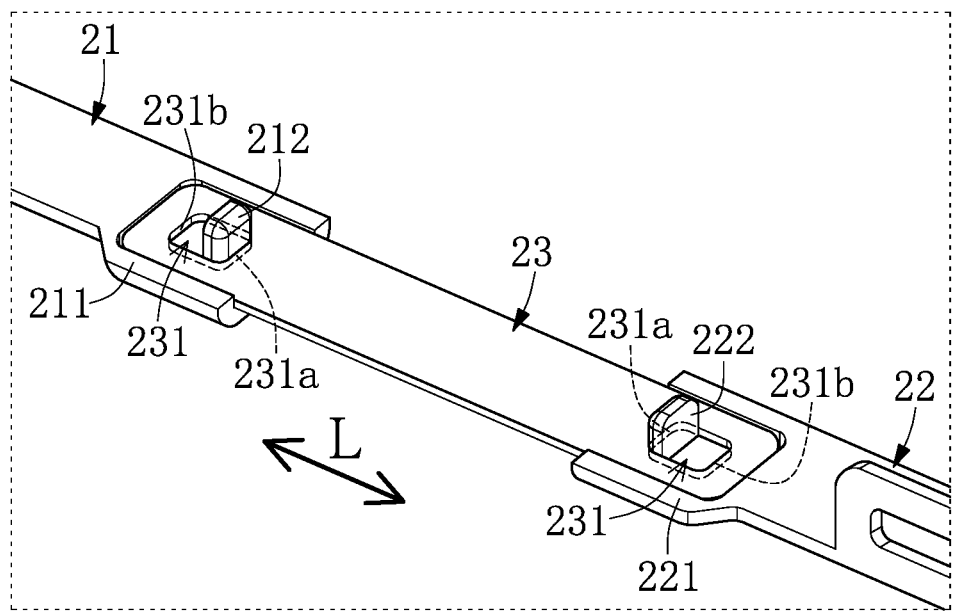
FIG. 4 is an enlarged view showing a part of an upper protecting case of the foldable protective assembly according to the first embodiment of the present disclosure.
Figure 5:
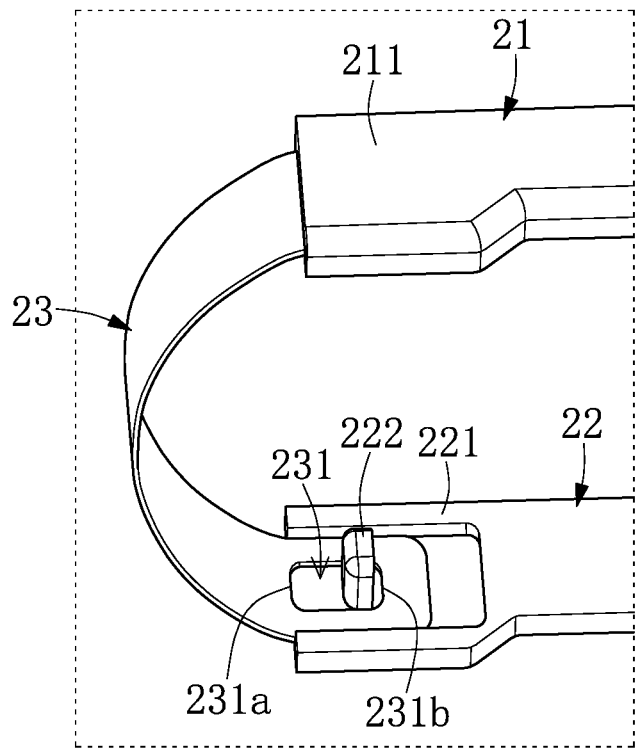
FIG. 5 is an enlarged view showing the part of the upper protecting case of FIG. 4 after being bent.

Specifically, as shown in FIG. 3 to FIG. 5, each of the upper elastic members 23 in the present embodiment can be movable relative to the first upper frame 21 and the second upper frame 22 at the same time, but the present disclosure is not limited thereto. Each of the two ends 211 of the first upper frame 21 has a first protrusion 212, each of the two ends 221 of the second upper frame 22 has a second protrusion 222, and two opposite portions of each of the two upper elastic members 23 each has two thru-holes 231 each defined by a plurality of inner walls 231a, 231b.

Moreover, in one of the two ends 211 of the first upper frame 21 and one of the two ends 221 of the second upper frame 22 that face each other, the first protrusion 212 and the second protrusion 222 are respectively coupled through the two thru-holes 231 of one of the two upper elastic members 23. When each of the two upper elastic members 23 is elastically bent, the first protrusion 212 and the corresponding second protrusion 222 move from two of the inner walls 231a, 231b (e.g., the two inner walls 231a shown in FIG. 4) adjacent to each other toward two of the inner walls 231a, 231b away from each other (e.g., the two inner walls 231b shown in FIG. 5).

As shown in FIG. 1 to FIG. 3, an outer contour of the lower protecting case 1 is substantially identical to that of the upper protecting case 2. The first lower frame 11 and the second lower frame 13 are respectively engaged with the first upper frame 21 and the second upper frame 22 along the thickness direction H so as to be defined as two engaged sets, the two upper elastic members 23 respectively face the two lower elastic members 15 along the thickness direction H, and one of the two engaged sets is rotatable relative to the other one of the two engaged sets by elastically bending the two lower elastic members 15 and the two upper elastic members 23. Moreover, the two engaged sets are configured to cover a periphery portion of the foldable mobile device.

It should be noted that the combination manner of any one of the two engaged sets (the engaged set of the first lower frame 11 and the first upper frame 21, or the engaged set of the second lower frame 13 and the second upper frame 22) can be changed according to design requirement, such as an engaging manner or a screwing manner.

As shown in FIG. 3, the screen protection film 200 is detachably assembled to at least one of the lower protecting case 1 and the upper protecting case 2, and is movable along the longitudinal direction L. In other words, one of the two engaged sets can be rotated relative to the other one of the two engaged sets so that the screen protection film 200 is elastically deformed by a force applied thereon. The screen protection film 200 can be directly engaged with the lower protecting case 1 or the upper protecting case 2, but the present disclosure is not limited thereto. For example, the screen protection film 200 can be indirectly engaged with the lower protecting case 1 or the upper protecting case 2 through other components.

In the present embodiment, the screen protection film 200 is detachably assembled to the lower protecting case 1, and includes two long edges 201 each parallel to the longitudinal direction L and two short edges 202 each parallel to the width direction W. Each of the two long edges 201 has a plurality of limiting portions 2011, each of the two short edges 202 has a plurality of buffering portions 2021, and each of the limiting portion 2011 and the buffering portion 2021 in the present embodiment is a protruding sheet having a thru-hole, but the present disclosure is not limited thereto. For example, in other embodiments of the present disclosure, the screen protection film 200 can have a rectangular shape, and the limiting portions 2011 and buffering portions 2021 are arranged inside of an outer contour of the rectangular shape.

Figure 6:
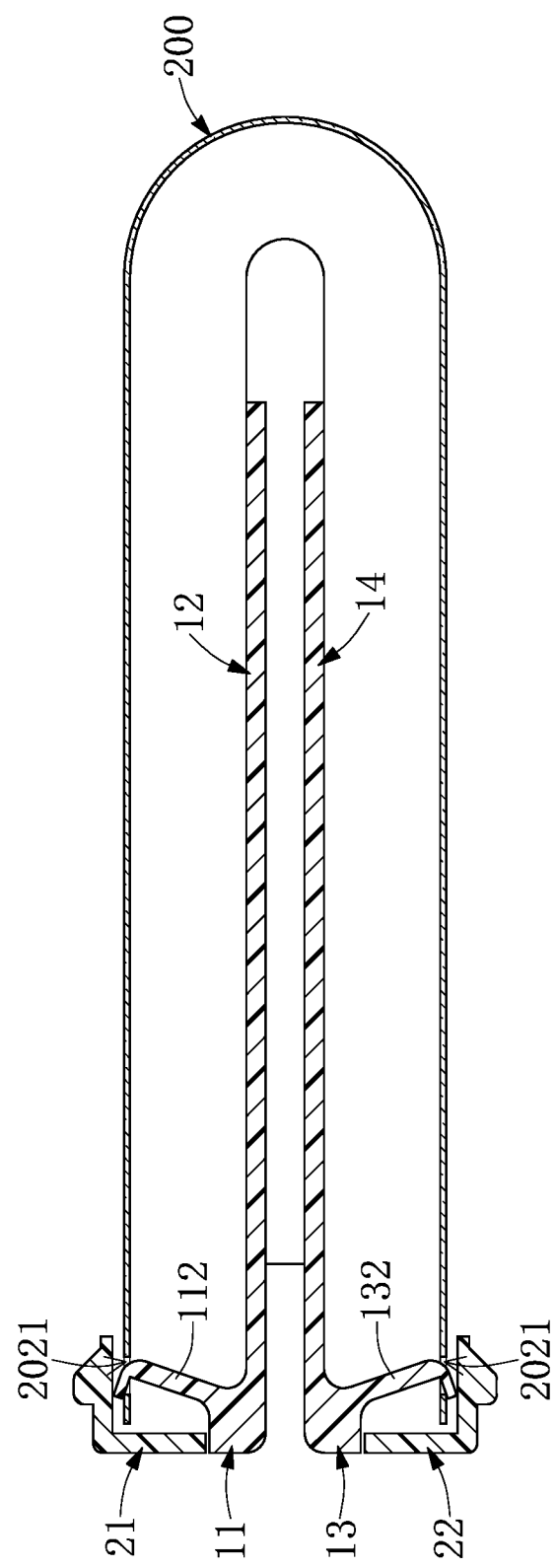
FIG. 6 is a cross-sectional view taken along cross-sectional line VI-VI of FIG. 2.

Specifically, as shown in FIG. 3 and FIG. 6, the limiting portions 2011 of the two long edges 201 are respectively assembled to the first lower frame 11 and the second lower frame 13 along the width direction W so as to prevent the screen protection film 200 from moving relative to the lower protecting case 1 along the width direction W. Accordingly, the protective case 100, when unfolded, can be used to fix the screen protection film 200 in position. The buffering portions 2021 of the two short edges 202 are respectively assembled to the first lower frame 11 and the second lower frame 13 along the longitudinal direction L, so that when the first lower frame 11 is rotated relative to the second lower frame 13, the first lower frame 11 and the second lower frame 13 can be configured to apply a force onto the screen protection film 200 through the buffering portions 2021 for maintaining the flatness of the screen protection film 200.

Each of the first lower frame 11 and the second lower frame 13 can be provided with a plurality of engaging structures 112, 132 that are in cooperation with the limiting portions 2011 and the buffering portions 2021. The limiting portions 2011 and the buffering portions 2021 can be assembled to the engaging structures 112, 132 along the longitudinal direction L in a loose-fitting manner, so that the screen protection film 200 can be easily stretched.

In summary, the screen protection film 200 is configured to be detachably disposed on the foldable screen of the foldable mobile device. In other words, the screen protection film 200 of the present embodiment can be not adhered to the foldable screen of the foldable mobile device, but the present disclosure is not limited thereto. For example, in other embodiments of the present disclosure, a portion of the screen protection film 200 corresponding in position to the first lower frame 11 (or the second lower frame 13) can be adhered to the foldable screen, so that the screen protection film 200 can be still stretchable.

Second Embodiment

Figure 7:
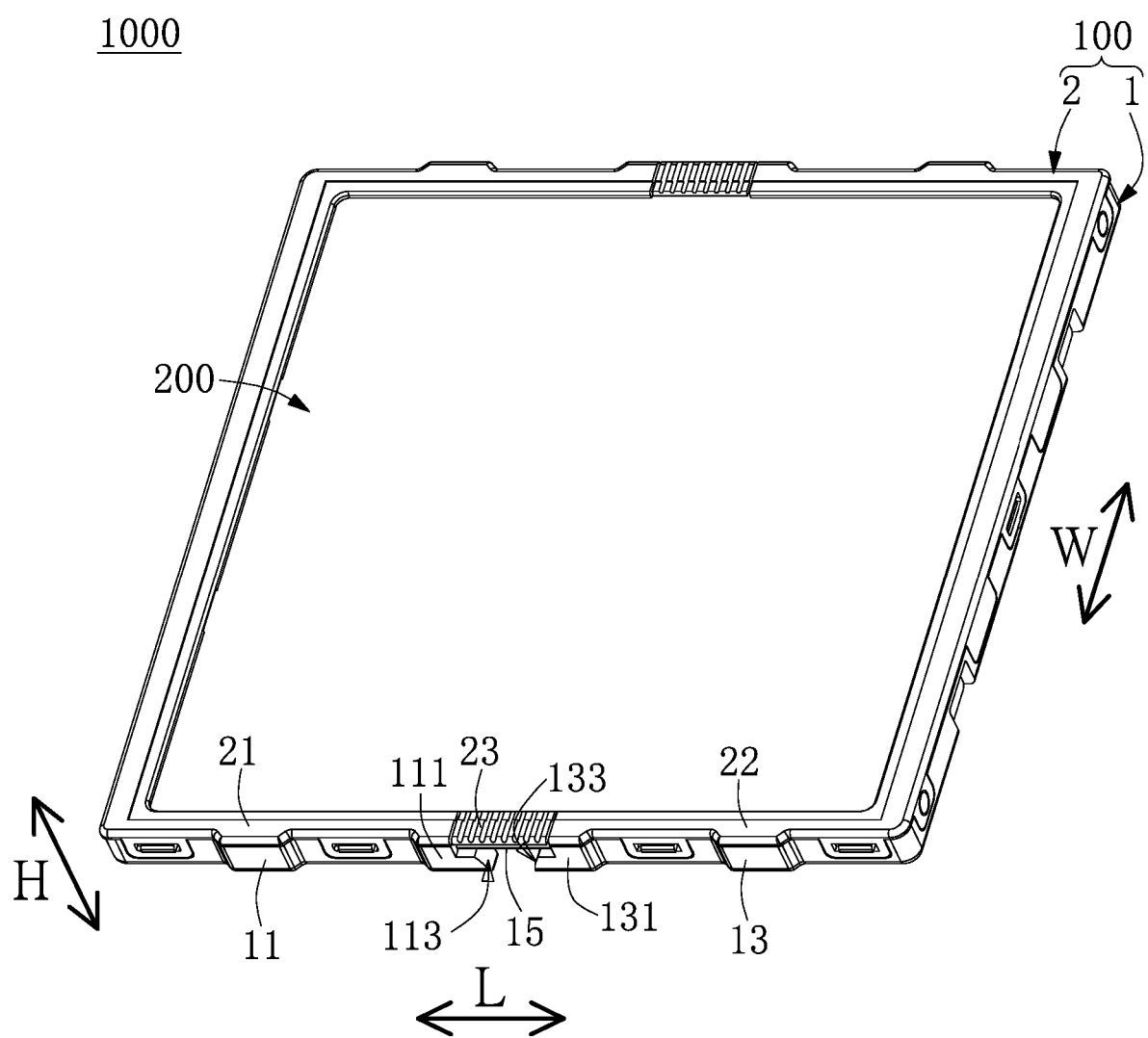
FIG. 7 is a perspective view of a foldable protective assembly according to a second embodiment of the present disclosure.
Figure 8:
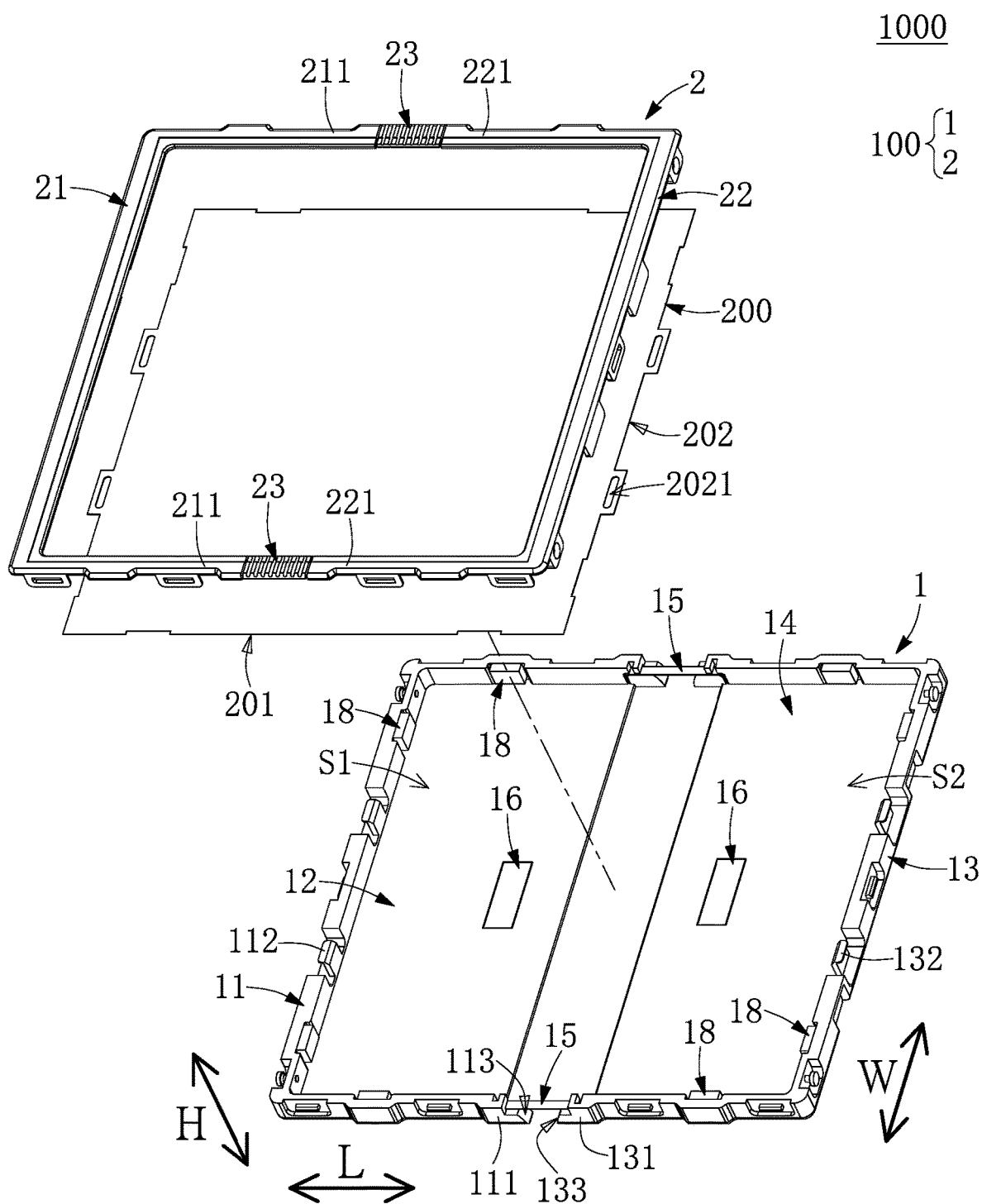
FIG. 8 is an exploded view of FIG. 7.
Figure 9:
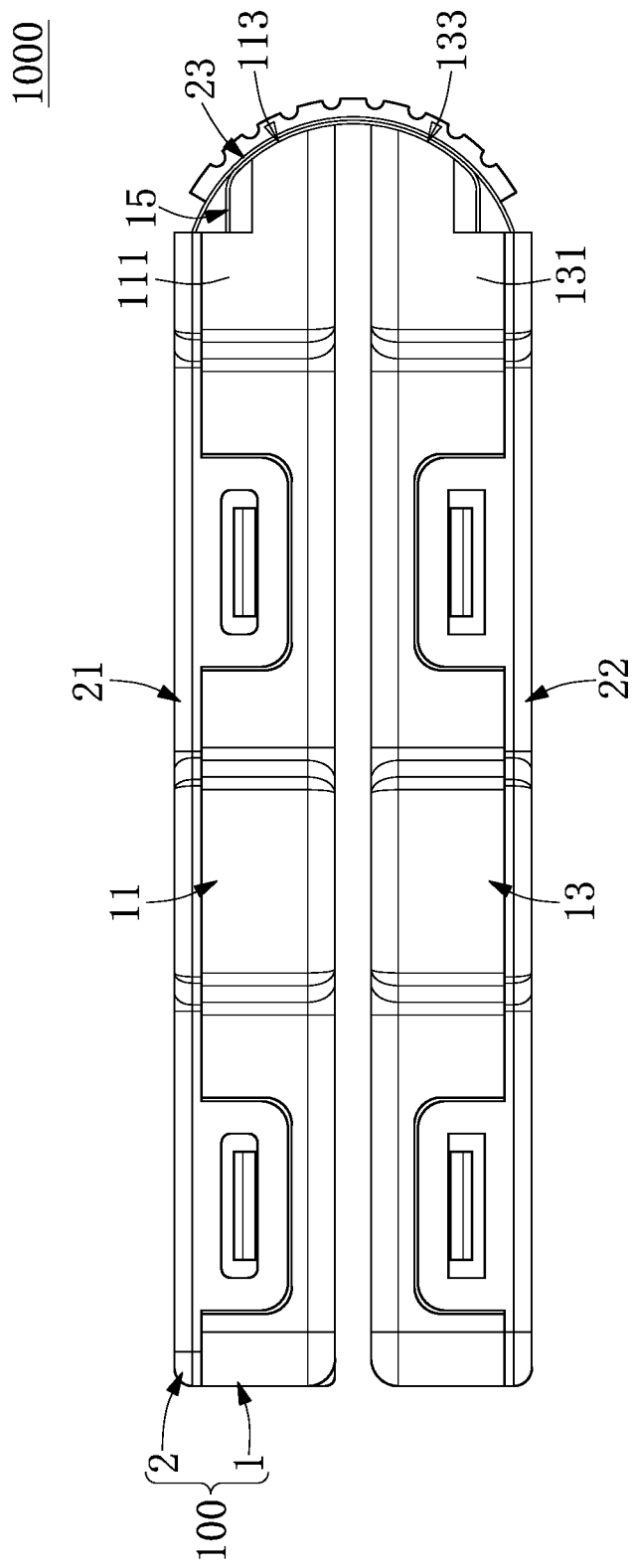
FIG. 9 is a side view showing the foldable protective assembly of FIG. 7 after being bent.
Figure 10:
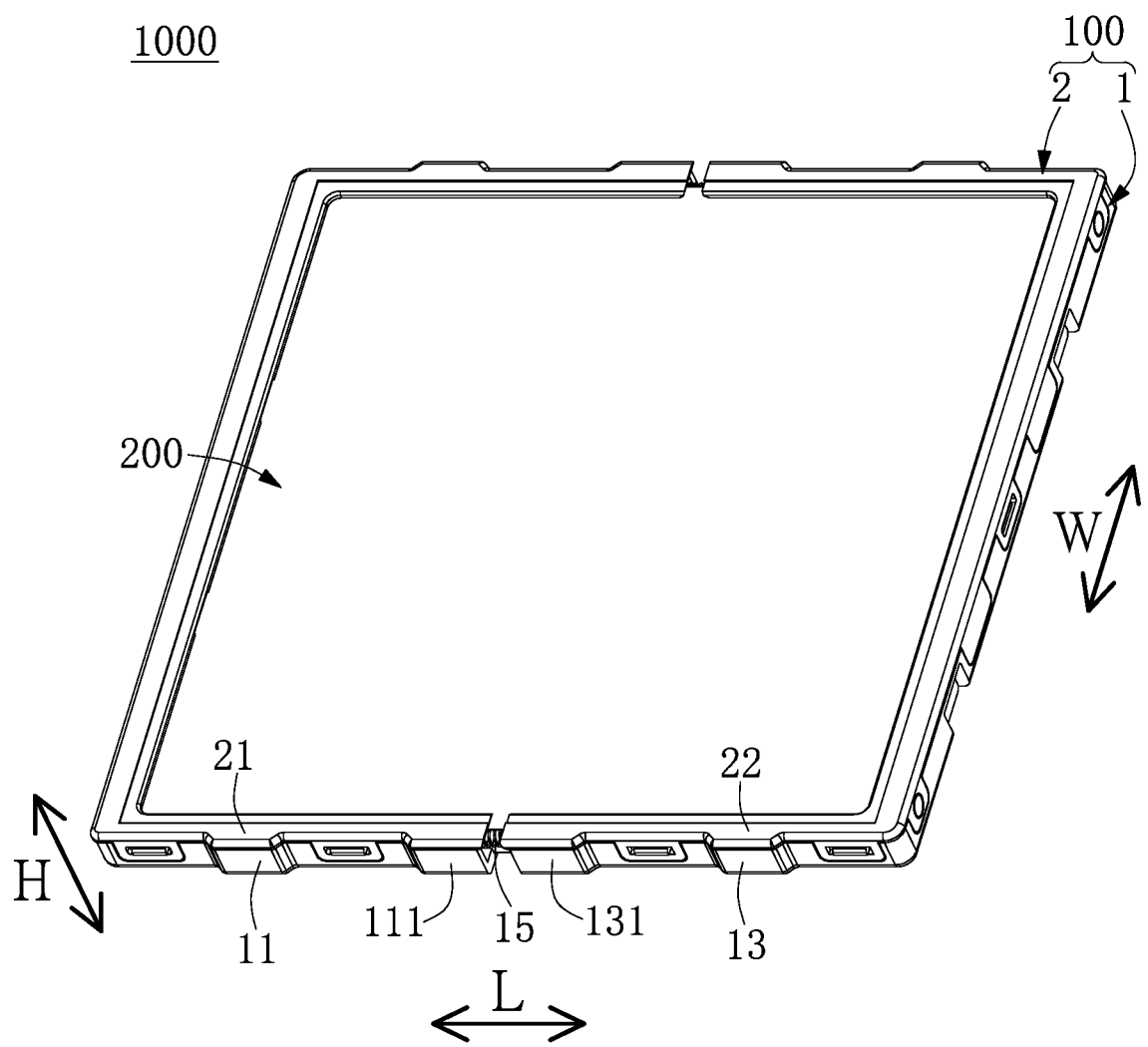
FIG. 10 is a perspective view of a foldable protective assembly according to a third embodiment of the present disclosure.
Figure 11:
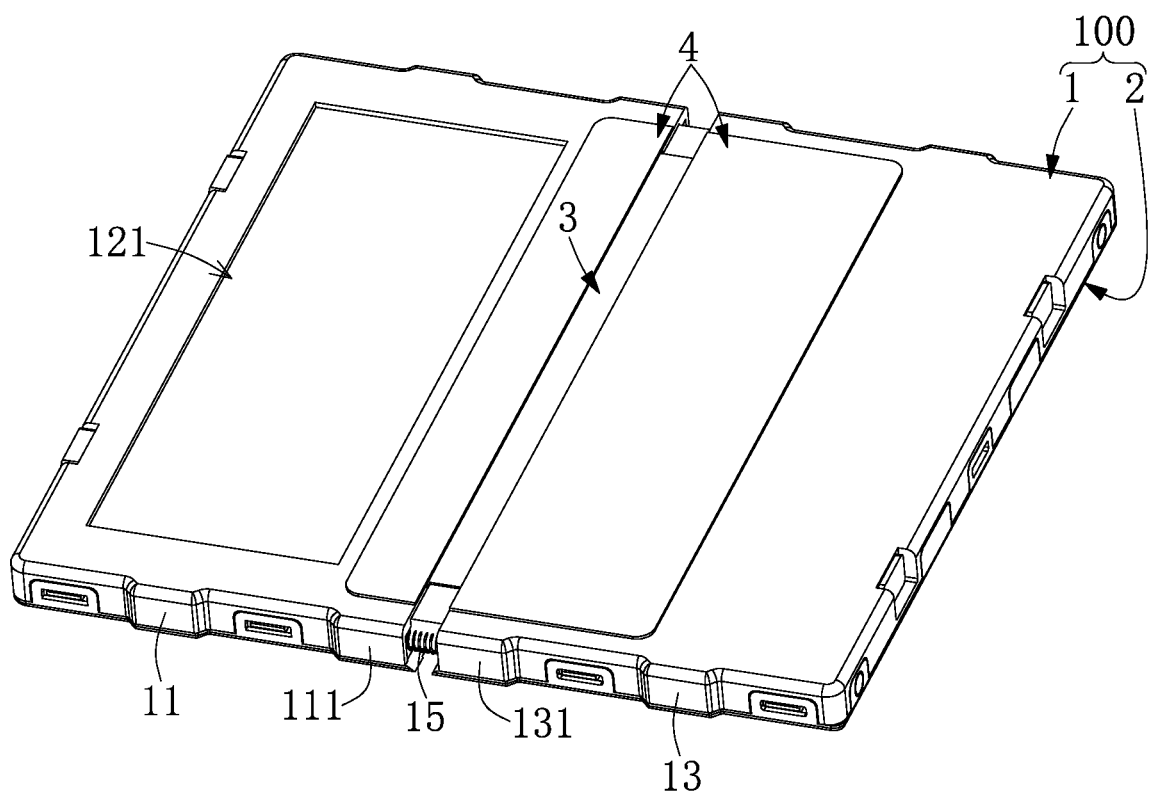
FIG. 11 is a perspective view showing the foldable protective assembly of FIG. 10 from another view angle.
Figure 12:
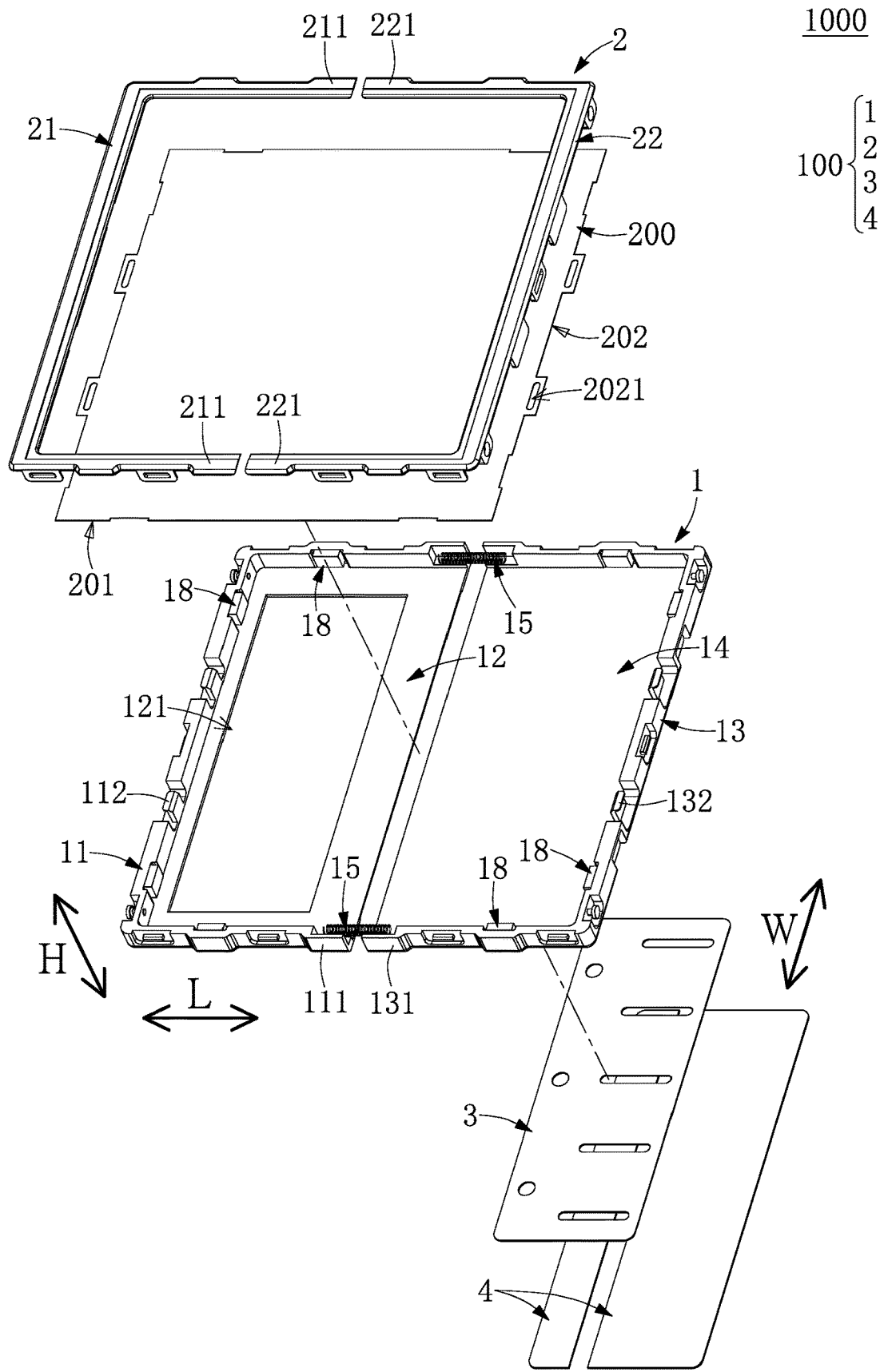
FIG. 12 is an exploded view of FIG. 10.
Figure 13:
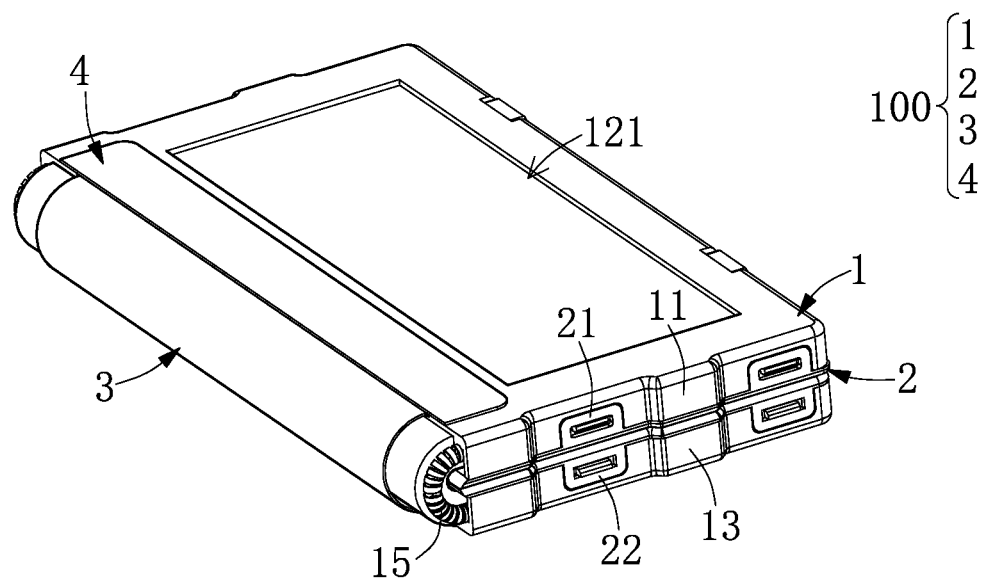
FIG. 13 is a perspective view showing the foldable protective assembly of FIG. 11 after being bent.

Referring to FIG. 7 to FIG. 9, a second embodiment of the present disclosure provides a foldable protective assembly 1000. Some components of the foldable protective assembly 1000 in the present embodiment are similar to the corresponding components of the foldable protective assembly 1000 disclosed in the first embodiment, so that the following description discloses only the different features of the present embodiment for the sake of brevity.

In the present embodiment, each of the two ends 111 of the first lower frame 11 has a supporting curved surface 113, and each of the two ends 131 of the second lower frame 13 has a supporting curved surface 133. When the first lower frame 11 is rotated relative to the second lower frame 13, the supporting curved surfaces 113, 133 of the first lower frame 11 and the second lower frame 13 abut against and support the two lower elastic members 15.

Moreover, the lower protecting case 1 in the present embodiment further includes a plurality of shock-absorbing members 18 (e.g., foams) respectively fixed on the first lower frame 11 and the second lower frame 13. Each of the shock-absorbing members 18 slightly protrudes from an inner edge of the corresponding first lower frame 11 (or the corresponding second lower frame 13), and the periphery portion of the foldable mobile device can be abutted against the shock-absorbing members 18, thereby improving the shockproof performance of the lower protecting case 1.

Third Embodiment

Referring to FIG. 10 to FIG. 13, a third embodiment of the present disclosure provides a foldable protective assembly 1000. Some components of the foldable protective assembly 1000 in the present embodiment are similar to the corresponding components of the foldable protective assembly 1000 disclosed in the first embodiment, so that the following description discloses only the different features of the present embodiment for the sake of brevity.

In the present embodiment, the foldable protective assembly 1000 is applied to an inwardly foldable mobile device (i.e., when the foldable mobile device is folded, the foldable screen is arranged on an inner side of the foldable mobile device). The lower protecting case 1 has a window 121 recessed in the first bottom board 12 and corresponding in position to a sub-screen of the foldable mobile device. Moreover, the upper protecting case 2 in the present embodiment excludes any upper elastic members 23. In other words, when the upper protecting case 2 is folded, the first upper frame 21 is stacked on the second upper frame 22, so that the first upper frame 21 and the second upper frame 22 need not be connected to each other.

Specifically, the protective case 100 further includes a foldable board 3 and two decoration sheets 4. The foldable board 3 is an elastic metallic plate or an elastic plastic board. The foldable board 3 is substantially arranged between the two decoration sheets 4, and the foldable board 3 is bridged between the first bottom board 12 and the second bottom board 14, thereby increasing the bending strength of the protective case 100. Moreover, the foldable board 3 in the present embodiment is fixed on outer surfaces of the first bottom board 12 and the second bottom board 14, and the two decoration sheets 4 respectively cover two portions of the foldable board 3 respectively disposed on the first bottom board 12 and the second bottom board 14.

In conclusion, the foldable protective assembly and the protective case of the present disclosure can be bent according to a foldable function of a foldable mobile device, so that the foldable mobile device can be physically protected in an unfolded state or a folded state. Specifically, the protective case is used to be fixed onto the foldable mobile device and to protect a foldable screen of the foldable mobile device by the combination of the lower protecting case and the upper protecting case.

Moreover, the foldable protective assembly can be provided with the screen protection film arranged in the protective case and arranged above the foldable screen, thereby providing a physical protection for the foldable screen. Compared to the conventional screen protection film using an adhesive, the screen protection film in the present embodiment can be used without any adhesive or can be used with an adhesive on a part thereof, so that the screen protection film can be slightly deformed along with the folding of the foldable mobile device for effectively protecting the foldable screen of the foldable mobile device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A foldable protective assembly for being detachably assembled to a foldable mobile device, comprising: a lower protecting case defining a longitudinal direction, a width direction, and a thickness direction, which are perpendicular to each other, wherein the lower protecting case includes a first lower frame and a second lower frame each having a U-shaped section perpendicular to the thickness direction extending along side walls of the foldable mobile device, wherein two ends of the first lower frame respectively face two ends of the second lower frame along the longitudinal direction; and two lower elastic members respectively connecting the two ends of the first lower frame to the two ends of the second lower frame; an upper protecting case detachably engaged with the lower protecting case and including: a first upper frame and a second upper frame each having a U-shaped section perpendicular to the thickness direction, wherein two ends of the first upper frame respectively face two ends of the second upper frame along the longitudinal direction; and two upper elastic members respectively connecting the two ends of the first upper frame to the two ends of the second upper frame; and a screen protection film detachably assembled on at least one of the lower protecting case and the upper protecting case and being movable along the longitudinal direction, wherein the first lower frame and the second lower frame are respectively engaged with the first upper frame and the second upper frame along the thickness direction so as to be defined as two engaged sets, and the two upper elastic members respectively face the two lower elastic members along the thickness direction; wherein one of the two engaged sets is rotatable relative to the other one of the two engaged sets by elastically bending the two lower elastic members and the two upper elastic members so that the screen protection film is elastically deformed by a force applied thereon; wherein the two engaged sets are configured to cover a periphery portion of the foldable mobile device, and the screen protection film is configured to be detachably disposed on a foldable screen of the foldable mobile device.

2. The foldable protective assembly according to claim 1, wherein the lower protecting case further includes:
a first bottom board, wherein edges of the first bottom board are connected to the first lower frame, and the first bottom board and the first lower frame jointly surround to define a first accommodating space; and
a second bottom board, wherein edges of the second bottom board are connected to the second lower frame, and the second bottom board and the second lower frame jointly surround to define a second accommodating space,
wherein the first bottom board and the second bottom board are configured to carry the foldable mobile device, and the first accommodating space and the second accommodating space are configured to accommodate a part of the foldable mobile device.

3. The foldable protective assembly according to claim 2, wherein the lower protecting case further includes two combining members respectively mounted on the first bottom board and the second bottom board, and when the first lower frame is rotated relative to the second lower frame to cause the first bottom board to face the second bottom board, the two combining members fix each other in position so as to maintain the relative positioning of the first bottom board and the second bottom board.

4. The foldable protective assembly according to claim 1, wherein each of the two ends of the first lower frame has a supporting curved surface, and each of the two ends of the second lower frame has a supporting curved surface, and wherein when the first lower frame is rotated relative to the second lower frame, the supporting curved surfaces of the first lower frame and the second lower frame abut against and support the two lower elastic members.

5. The foldable protective assembly according to claim 1, wherein each of the two ends of the first upper frame has a first protrusion, each of the two ends of the second upper frame has a second protrusion, and two opposite portions of each of the two upper elastic members respectively has two thru-holes each defined by a plurality of inner walls, wherein in one of the two ends of the first upper frame and one of the two ends of the second upper frame that face each other, the first protrusion and the second protrusion are respectively coupled through the two thru-holes of one of the two upper elastic members, and wherein when each of the two upper elastic members is elastically bent, the first protrusion and the corresponding second protrusion move from two of the inner walls adjacent to each other toward two of the inner walls away from each other.

6. The foldable protective assembly according to claim 1, wherein the screen protection film is detachably assembled to the lower protecting case, and includes:
two long edges each parallel to the longitudinal direction and each having a plurality of limiting portions, wherein the limiting portions of the two long edges are respectively assembled to the first lower frame and the second lower frame so as to prevent the screen protection film from moving relative to the lower protecting case along the width direction; and
two short edges each parallel to the width direction and each having a plurality of buffering portions, wherein the buffering portions of the two short edges are respectively assembled to the first lower frame and the second lower frame, so that when the first lower frame is rotated relative to the second lower frame, the first lower frame and the second lower frame are configured to apply force onto the screen protection film through the buffering portions.

* * * * *